(12) United States Patent
Leung et al.

(10) Patent No.: US 8,523,971 B2
(45) Date of Patent: Sep. 3, 2013

(54) MULTILAYER NANOFIBER FILTER

(75) Inventors: Wallace Woon-Fong Leung, Hong Kong (CN); Chi Ho Hung, Hong Kong (CN)

(73) Assignee: The Hong Kong Polytechnic University, Hong Kong (HK)

( * ) Notice: Subject to any disclaimer, the term of this patent is extended or adjusted under 35 U.S.C. 154(b) by 417 days.

(21) Appl. No.: 12/775,465

(22) Filed: May 6, 2010

(65) Prior Publication Data
US 2010/0307119 A1  Dec. 9, 2010

Related U.S. Application Data

(60) Provisional application No. 61/176,115, filed on May 7, 2009.

(51) Int. Cl.
*B01D 46/00* (2006.01)
*B01D 46/52* (2006.01)

(52) U.S. Cl.
USPC .................. 55/487; 55/486; 55/521; 55/527; 55/528

(58) Field of Classification Search
USPC ............................ 55/486, 487, 521, 527, 528
See application file for complete search history.

(56) References Cited

U.S. PATENT DOCUMENTS

| | | | | |
|---|---|---|---|---|
| 4,650,506 A | * | 3/1987 | Barris et al. | 55/487 |
| 6,171,684 B1 | * | 1/2001 | Kahlbaugh et al. | 428/212 |
| 6,746,517 B2 | * | 6/2004 | Benson et al. | 95/273 |
| 2008/0264259 A1 | * | 10/2008 | Leung | 96/143 |
| 2010/0247404 A1 | * | 9/2010 | Ptak et al. | 422/187 |
| 2010/0285101 A1 | * | 11/2010 | Moore et al. | 424/445 |

FOREIGN PATENT DOCUMENTS

| | | |
|---|---|---|
| CN | 1471421 A1 | 1/2004 |
| CN | 101244368 A1 | 8/2008 |
| DE | 10249998 B2 | 5/2004 |
| GB | 1239484 B1 | 7/1971 |
| WO | WO 0220130 A2 * | 3/2002 |
| WO | 2008118955 A1 | 10/2008 |
| WO | WO 2008118955 A1 * | 10/2008 |
| WO | 2009014539 A1 | 1/2009 |
| WO | WO 2009014539 A1 * | 1/2009 |

OTHER PUBLICATIONS

International Search Report & Written Opinion of PCT application No. PCT/CN2010/072514 filed on May 7, 2010.

* cited by examiner

*Primary Examiner* — Robert Clemente
(74) *Attorney, Agent, or Firm* — Duane Morris LLP; Siegfried J. W. Ruppert

(57) ABSTRACT

A method of making a multilayer filter and the multilayer filter made by the method. The method includes generally two steps. The first step is to coat a layer of nanofibers on a single side or both sides of a substrate medium to obtain a composite filter medium, and the second step is to fold the composite filter medium in a serpentine fashion to form a multilayer filter. The second step may alternatively be accomplished by stacking up a number of sheets of the composite filter medium to form a multilayer filter having a structure of two layers of nanofibers being sandwiched between two layers of said substrate medium. The resulting multilayer filter produced by either method contains at least one structural unit which has two layers of nanofibers being sandwiched between two layers of the substrate medium.

33 Claims, 17 Drawing Sheets

A

B

C

D

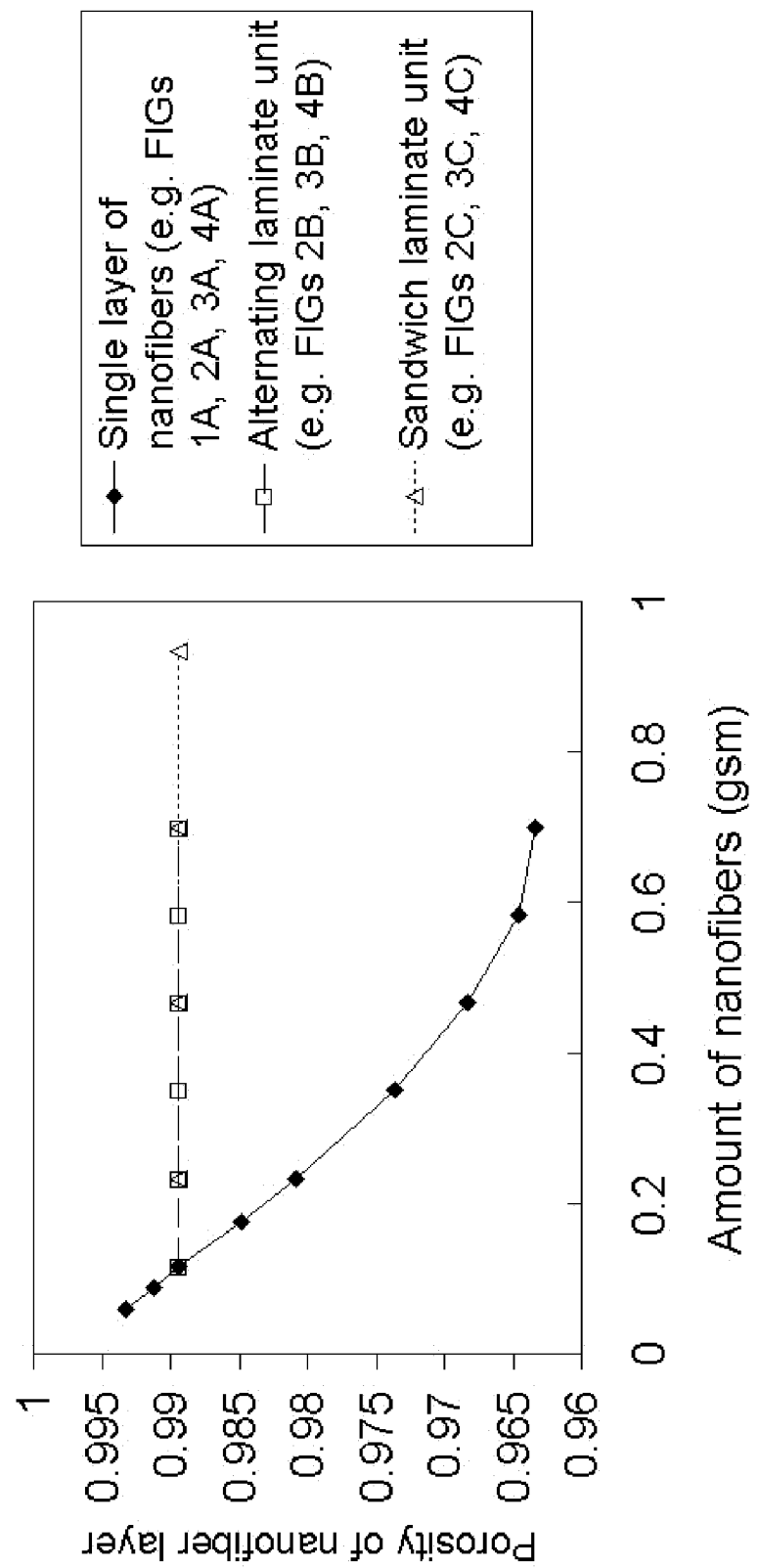

MULTILAYER NANOFIBER FILTER

This application claims benefit from U.S. Provisional Application No. 61/176,115, filed May 7, 2009.

BACKGROUND

Nanofibers ranging from 10 nm to 1000 nm have been used in filtration medium to capture submicron particles below 1000 nm. The ability of nanofibers to capture particles is believed to be due to combination of interception of submicron particles by the fibers as well as the Brownian motion or "random walk" of submicron particles, both of which facilitate the particles to be captured by the large surface/mass ratio of the nanofibers.

Conventional filtration media may have a layer of nanofibers with a size distribution in a range of 100 to 300 nm laid on a substrate layer of the medium, as depicted in FIG. 1A. Further increase of capture capability may be obtained by increasing the nanofiber surface area such as by reducing the fiber diameter and/or by increasing the packing density of the nanofibers, as measured in terms of grams of nanofibers per square meter. However, since the nanofibers do not possess structural rigidity, when more fibers are laid, the additional nanofibers often compress to form a dense (i.e. low porosity or void space) and thick layer that substantially increase the pressure drop across the medium. This lowers the permeability of the filtration medium to airflow, and resulted in undesirable breathability to the filtration medium.

Consequently, it is desirable to develop an improved nanofiber filtration medium that has a high filtration efficiency but low pressure drop. It is also desirable to develop a method of making the nanofiber filtration medium having these improved properties.

SUMMARY

According to one aspect, a filtration medium may include at least one substrate layer, and at least two nanofiber layers. The substrate layer is sandwiched between the nanofiber layers in a series to form an alternating laminate unit.

According to another aspect, a method of making a filtration medium may include coating nanofibers onto a substrate layer either on one surface or on both surfaces to form a laminate unit, and stacking at least two of the units in a series to form an alternating laminate unit.

According to a further aspect, a method of making a filtration medium may include coating nanofibers onto a substrate layer either on one surface or on both surfaces to form a laminate unit, and folding the laminate unit in a serpentine arrangement.

As a best mode at the present time, a method of making a filtration medium which includes multiple nanofiber layers supported by substrate medium wherein all the nanofiber layers have open pores exceeding 98% by volume.

BRIEF DESCRIPTION OF THE DRAWINGS

FIG. 7 depicts the porosity of the filtration medium as measured against the prior art.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Figures 1, 2, 3, 4:
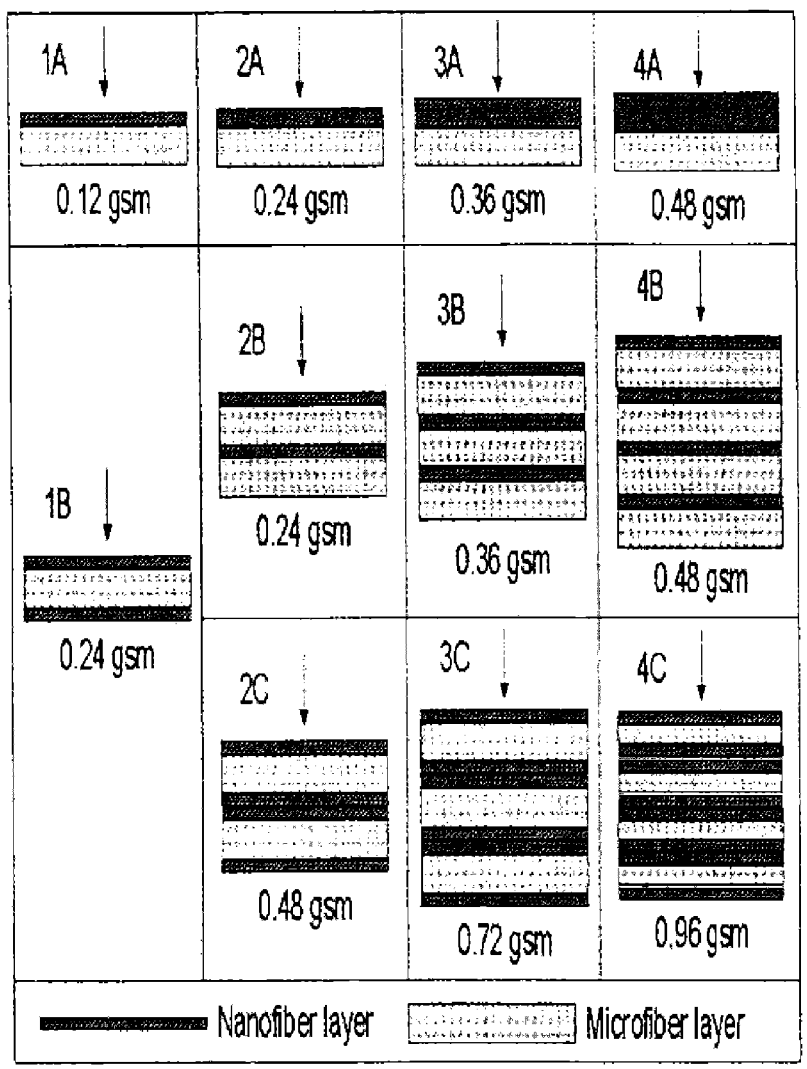
FIG. 1A depicts a prior art filtration medium with a nanofiber layer on a substrate layer having 0.12 grams per square meter of nanofibers.
FIG. 1B depicts the filtration medium of the present invention having the substrate layer sandwiched between the nanofiber layers having 0.12 grams per square meter of nanofibers on each side.
FIG. 2A depicts a prior art filtration medium of FIG. 1A having 0.24 grams per square meter of nanofibers.
FIG. 2B depicts the filtration medium of the present invention having two filtration media as depicted in FIG. 1A stacked up to form a laminate unit having 0.24 grams per square meter of nanofibers.
FIG. 2C depicts the filtration medium of the present invention having two filtration media as depicted in FIG. 1B stacked up to form a laminate unit having 0.48 grams per square meter of nanofibers.
FIG. 3A depicts a prior art filtration medium of FIG. 1A having 0.36 grams per square meter of nanofibers.
FIG. 3B depicts the filtration medium of the present invention having three filtration medium as depicted in FIG. 1A stacked up to form a laminate unit having 0.36 grams per square meter of nanofibers.
FIG. 3C depicts the filtration medium of the present invention having three filtration medium as depicted in FIG. 1B stacked up to form a laminate unit having 0.72 grams per square meter of nanofibers.
FIG. 4A depicts a prior art filtration medium of FIG. 1 having 0.48 grams per square meter of nanofibers.
FIG. 4B depicts the filtration medium of the present invention having four filtration medium as depicted in FIG. 1A stacked up to form a laminate unit having 0.48 grams per square meter of nanofibers.
FIG. 4C depicts the filtration medium of the present invention having four filtration medium as depicted in FIG. 1B stacked up to form a laminate unit having 0.96 grams per square meter of nanofibers.

Furthermore, it should be understood that the invention is not limited to the precise embodiments described below, and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention A filtration medium may include one substrate layer and at least one nanofiber layers coated on at least one side of said substrate layer to form a bi-layer laminate unit, as depicted in FIG. 1A. In another arrangement, a filtration medium may also include at least one substrate layer, and at least two nanofiber layers. The substrate layer may be sandwiched between the nanofiber layers in a series to form an alternating tri-layer laminate unit, as depicted in FIG. 1B. The nanofiber layers and the substrate layer may adhere to one another to form a well-bonded laminate structure. The term "well-bonded laminate structure" means a multilayer filtration medium in which none of the layers are substantially corrugated. Using layers with small thickness may facilitate the formation of a well-bonded laminate structure.

To increase capture efficiency while reduce pressure drop, the filtration medium may have multiple layers, as depicted in FIGS. 2B, 2C, 3B, 3C, 4B and 4C. The arrows indicate the direction of airflow. The multilayer filtration medium may include more than one bi-layer or one tri-layer unit arranged in a series of parallel and repeating bi-layer or tri-layer laminate units, such that the filtration medium alternates between nanofiber layers and substrate layers. The number of bi-layers and tri-layers in the filtration medium may be determined by factors including the desired overall polymer packing density to reach the desired particle capture efficiency, the desired overall medium thickness, the thickness of each layer, and the allowed maximum pressure drop. The filtration medium may thus have higher filtration efficiency by virtue of increased packing density, but without incurring high pressure drop across the filtration medium.

The filtration medium of the instant configuration may offer many advantages: the nanofibers may maintain a low solid volume fraction (or equivalently a higher porosity) in each nanofiber layer, the total thickness of the nanofiber layers in the filter may well exceed the single nanofiber layer having the same total polymer packing density (i.e. same grams per square meter or "gsm"), a high particle capture efficiency may be attained with submicron particles, a lower pressure drop may be achieved when compared to the single layer with the same packing density (i.e. same gsm), the substrate layer may act as a support providing mechanical stress (tensile) for the filtration medium, and the substrate layer may serve as a filter medium.

One example of the multilayer filtration medium may include two nanofiber layers and two substrate layers stack together in an alternating configuration, as depicted in FIG. 2B, which stands in contrast to the prior art that includes only a single nanofiber layer bonded to a single substrate layer, as depicted in FIG. 2A. In this example, both the filtration media of FIGS. 2A and 2B contain 0.24 $g/m^2$ of nanofibers, while FIG. 2C contains 0.48 $g/m^2$.

Another example of the multilayer filtration medium may include three nanofiber layers and three substrate layers stack together in an alternating configuration, as depicted in FIG. 3B, which stands in contrast to the prior art that includes only a single nanofiber layer bonded to a single substrate layer, as depicted in FIG. 3A. In this example, both the filtration media of FIGS. 3A and 3B contain 0.36 $g/m^2$ of nanofibers while the three tri-layer stackup in FIG. 3C contains 0.72 $g/m^2$.

A further example of the multilayer filtration medium may include four nanofiber layers and four substrate layers stack together in an alternating configuration, as depicted in FIG. 4B, which stands in contrast to the prior art that includes only a single nanofiber layer bonded to a single substrate layer, as depicted in FIG. 4A. In this example, both the filtration media of FIGS. 4A and 4B contain 0.48 $g/m^2$ of nanofibers while the four-layer medium in FIG. 4C contains 0.96 $g/m^2$.

The nanofibers in the filtration medium may be obtained in a variety of ways. For example, nanofibers may be produced by electrospinning a polymer solution. In another example, nanofibers may be obtained by melt-blown polymers. Examples of applicable polymers may include polyolefin, polyacetal, polyamide, polyester, cellulose ether and ester, polyalkylene sulfide, polyarylene oxide, polysulfone, modified polysulfone polymers, nylon, polystyrene, polyacrylonitrile, polycarbonate and mixtures thereof. In one example, the nanofibers may be formed by electrospinning Nylon 6 polymer from a 98% formic acid solution. In another example, the nanofibers may be formed by electrospinning polystyrene or polyvinyl chloride from solutions in tetrahydrofuran (THF). In another example, the nanofibers may be formed by electrospinning polyethylene oxide (PEO) dissolved in water. In yet another example, polyethylene-terephthalate (PET) and polyethylene-naphthalate (PEN) may be electrospun or spin-melted into nanofibers directly from their polymer melts. So long as the resulting solution or polymer melt has a viscosity similar to that of honey, with viscosity of at least 2000-3000 cP at 25° C., the solution, melt or suitable candidate materials can thus be spun into nanofibers. Nanofibers may also be formed using other processes known to one skilled in the art.

The nanofibers may have an average diameter of about 5 to about 900 nanometers, preferably from about 100 to about 300 nanometers, and more preferably from about 150 to about 250 nanometers. For example, electrospun Nylon 6 nanofibers may have an average fiber diameter from about 147 to about 249 nanometers, when the weight percentage of Nylon 6 in a polymer solution ranges from about 18% to about 24%, and under the electrospinning condition of 25 kV electrode voltage and 14 cm tip-to-collector distance. The average fiber diameter may be characterized by taking an SEM (scanning electron microscope) image and randomly selecting and measuring the diameters of 30 nanofibers from the image. By reducing the distance between the tip-to-collector, e.g. 5 centimeters, the fiber diameter can increase to 600-800 nanometers. One possible explanation for this reduction in diameter is that the fibers do not have time to get thinner (i.e. smaller in diameter) by stretching through charge repulsion from like charges deposited on the fiber surface.

The substrate layer may include any porous and non-woven materials that may provide mechanical strength as support for the filtration medium. For example, the substrate layer may include microfibers. Examples of microfibers may include polyethylene, polyethylene, glass, cellulose acetate, activated carbon fiber or combinations thereof. The microfibers may have an average diameter of about 1 to about 30 microns, which may include finer microfibers having an average diameter of about 1 to about 20 microns and coarser microfibers having an average diameter of about 10 to 30 microns, such as activated carbon fiber. The content of the microfibers in the filtration medium may vary from about 10 to about 600 grams per square meter of filter area.

In one example, the nanofibers may be directly electrospun onto the surface of a sheet of non-woven microfibers. In another example, the microfibers may be placed in a liquid, and nanofibers may be electrospun onto them. The liquid suspension may then be air-circulated, and the liquid may be removed under vacuum. Subsequently, the microfibers and nanofibers may be compressed mechanically together with a small amount of compatible adhesive to form a rigid structure.

The substrate layer may include one or more additives, such as in a particulate, fiber, whisker, or powder form. Examples of additives may include anti-microbial substrates. The term "anti-microbial substrates" means any chemicals or particles that may be used to kill or make unviable microbes, viruses or bacteria. Examples of anti-microbial substrates may include nano-particles made of magnesium oxide (MgO), silver (Ag) compounds including silver nitrate, titanium oxide nanoparticles, Poly(N-benzyl-4-vinylpyridinium chloride), or combinations thereof.

Examples of additives may also include adsorption particles. The term "adsorption particles" means nano-sized adsorbents, with molecule sizes from about 0.5 to about 100 nanometers, that may physically attract and adsorb particles and volatile organic compounds (VOCs) from a fluid stream to the surface of the adsorption particle. This attraction may involve electrostatic or chemical interaction. Examples of adsorption particles may include activated carbon, silica gel, activated alumina, zeolites, porous clay minerals, molecular sieves, or combinations thereof. Nano-sized absorbents made of zinc oxide, calcium oxide, cupric oxide, magnesium oxide, manganese dioxide, manganese oxide, aluminum oxide, and zeolite may also be used to filter specific molecules such as hydrogen sulphide.

The additives may further include a plurality of desorption substances. The term "desorption substances" mean particles or vapor that may diffuse away from the surfaces or pores of the substrate layer. For example, desorption substances may include medication or fragrance particles or vapor. The desorption substances may be diffused gradually over time, rather than being released in a single dose or in multiple dose pulses.

Desorption substances for treating asthma and respiratory diseases may be used in medical applications. Examples of desorption substances may include steroids for chronic obstructive pulmonary disease; albuterol powder for the treatment of asthma; respirable antisense oligonucleotides (RASONs) for attenuating specific disease-associated mRNAs; Spiriva HandiHaler® (tiotropium bromide, available from Boehringer Ingelheim) for the treatment of bronchospasm associated with chronic obstructive pulmonary disease; Qvar® (beclomethasone dipropionate, available from Ivax) for the treatment of asthma; Xopenex® (available from Sepracor) as inhaled solution for treatment of reversible obstructive airway disease; DuoNeb® (albuterol sulfate and ipratropium bromide, available from Dey Laboratories) for the treatment of bronchospasm associated with COPD; Foradil Aerolizer® (formoterol fumarate inhalation powder, available from Novartis) as bronchodilator for COPD, asthma and bronchospasm; Ventolin HFA® (albuterol sulfate inhalation aerosol, available from GlaxoSmithKline) for the treatment or prevention of bronchospasm; Tri-Nasal Spray® (triamcinolone acetonide spray, available from Muro Pharmaceutical) for treatment of nasal symptoms of allergic rhinitis in adults and children age 12 or older; Proventil HFA Inhalation Aerosol® (available from 3M Pharmaceuticals) for treatment or prevention of bronchospasm; Rhinocort Aqua Nasal Spray® (available from AstraZeneca) for nasal spray containing budesonide; or combinations thereof.

The desorption substances may also be used in household, cosmetic or industrial applications to modulate the immediate surrounding environment. In one example, Symbicort® made by Astrazeneca and Serevent® made by GSK (GlaxoSmithKline) may be used for both adsorption and release of particles. These may be in powder form or liquid aerosol form that may be adsorbed onto the substrate layers.

The filtration medium may also include one or more cover layers bonded to the laminate. The cover layer may include, for example, a non-woven material. The filtration medium may further include a hydrophobic layer bonded to one of the cover layers. The hydrophobic layer may be configured to allow free gas exchange to occur across the filtration medium, while preventing water and other aqueous liquids from entering. Thus the hydrophobic layer can prevent virus bearing water droplet from wetting and penetrating the cover. The hydrophobic layer may be non-polar. Examples of non-polar polymers include PTFE, glass composites and nylon. Polyethersulfone (PES) and acrylic copolymers may also be used to render the filtration medium hydrophobic, which may cause membranes to become non-wettable by most low-surface tension liquids. Biodegradable polymers may also be used, which may include aliphatic polyesters such as poly (lactic acid), poly(glycolic acid), polycaprolactone, and their copolymers.

Geometries of the Multilayer Filtration Medium

In one embodiment, the multilayer filtration medium may include a nanofiber layer coated on a porous substrate layer, as depicted in FIG. 9A, which may be folded into a multilayer of nanofibers in a serpentine arrangement. For example, a multilayer filtration medium with five nanofiber layers is depicted in FIG. 9B. In another embodiment, the multilayer filtration medium may include two nanofiber layers coated on a porous substrate layer, as depicted in FIG. 9C, which may be folded into a multilayer of nanofibers in a serpentine arrangement. For example, a multilayer filtration medium with ten nanofiber layers is depicted in FIG. 9D.

Method of Making

A method of making the multi-layer filtration medium may include coating nanofibers onto a substrate medium to form a laminate unit, as shown in FIG. 1A, and stacking at least two of the units in a series of parallel and repeating bi-layer laminate units, such that the filtration medium alternates between nanofiber layers and substrate layers.

Another method of making the multi-layer filtration medium may include coating nanofibers on both sides of a substrate to form a laminate unit, as shown in FIG. 1B, and stacking at least two of the units in a series of parallel and repeating bi-layer laminate units, such that the substrates will be separated by two layers of nanofibers.

Quality Factor

Quality factor (QF) is defined as $QF=-\ln(1-\eta)/\Delta P$, where $\eta$ is the collection efficiency provided by a filter in capturing particles of specific size, and $\Delta P$ is the pressure drop across the filter. A filter having a higher $\eta$ and/or a lower $\Delta P$, thus yielding a higher QF, may be said to have a better performance.

The relative quality factor (RQF) is defined as $RQF=QF_2/QF_1$, where $QF_1$ is the quality factor of a filter as a performance baseline, and $QF_2$ is the quality factor of another filter to be compared with.

Reference will now be made in detail to the preferred embodiments of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the filtration medium is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

The filtration medium is further illustrated by the following examples, which are not to be construed in any way as imposing limitations upon the scope thereof. On the contrary, it is to be clearly understood that resort may be had thereof which, after reading the description herein, may suggest themselves to those skilled in the art without departing from the spirit of the specification and/or the scope of the appended claims.

EXAMPLES

Example 1

Thickness Comparison of Filtration Media

Figure 5A:
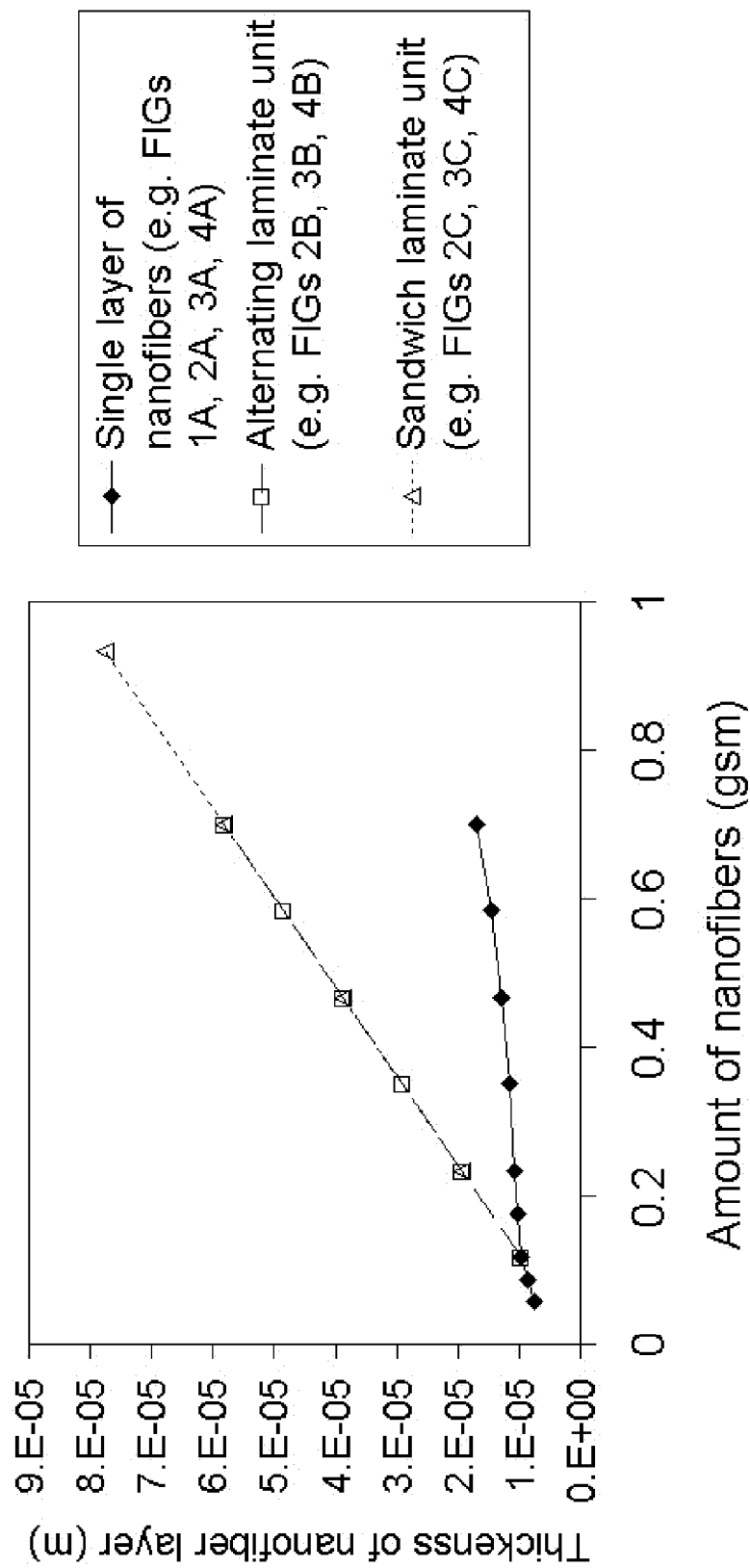
FIG. 5A depicts the thickness of nanofiber layer in filtration medium as measured against the prior art.
Figure 5B:
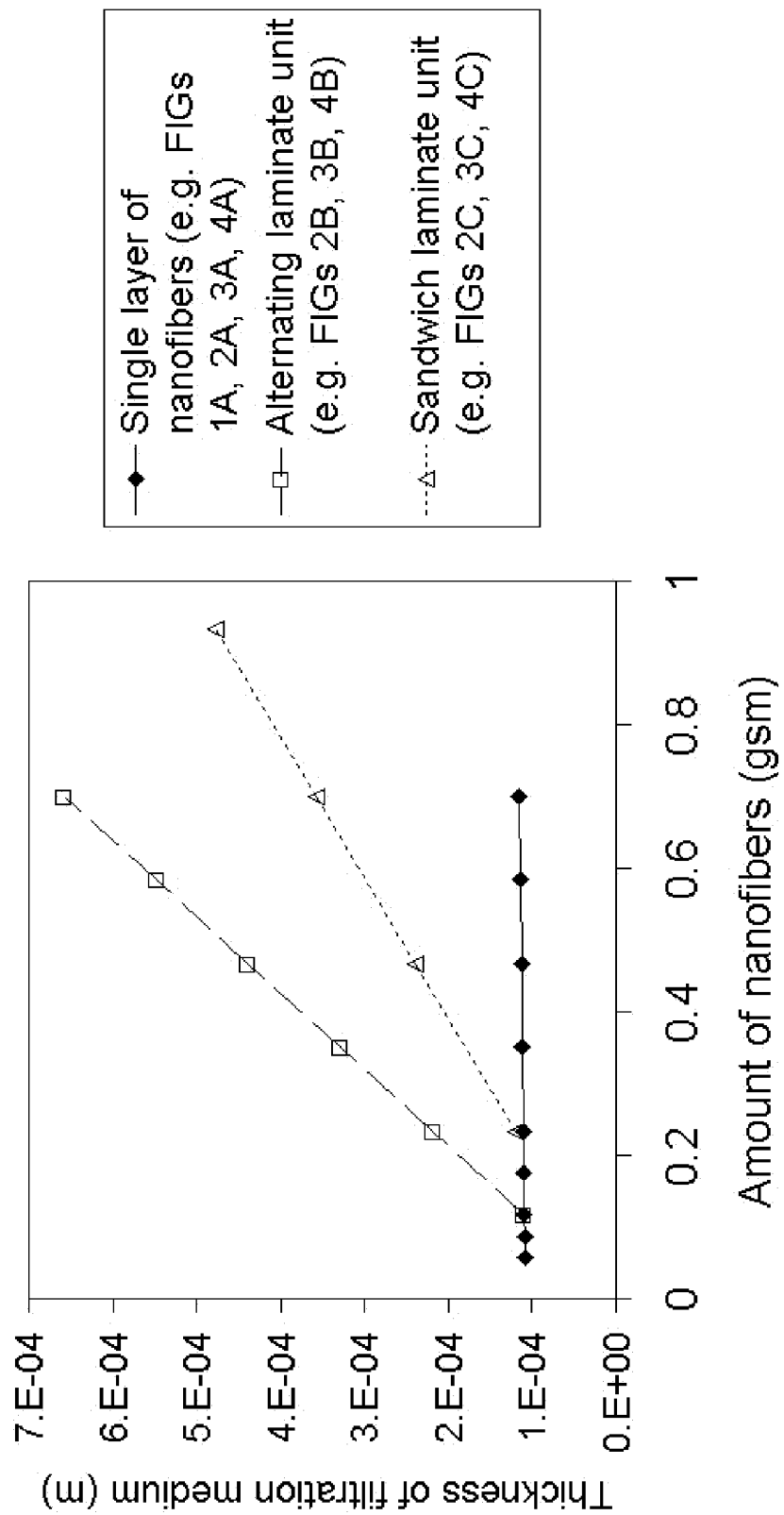
FIG. 5B depicts the thickness of filtration medium as measured against the prior art.

The determined thickness of nanofiber layer from electrospinning typical polymer/solvent combination, for example Polyethylene Oxide (PEO) in propanol, Nylon 6 (N6) in formic acid, Polystyrene (PS) in tetrahydrofuran (THF) and Polyvinyl Chloride (PVC) also in THF, is depicted in FIG. 5A. The results have indicated that for filtration medium formed by coating a layer of nanofibers on a substrate medium (e.g. filtration medium as depicted in FIGS. 1A, 2A, 3A and 4A), the thickness of nanofiber layer increased moderately, from 9.694 microns at 0.1167 gsm to only 16.92 microns at 0.7 gsm. In contrast, for filtration medium in the form of a laminate unit, the thickness of nanofiber layer increased significantly from 9.694 microns at 0.1167 gsm to 58.16 microns at 0.7 gsm. By including the thickness of substrate medium (approximately $1\times10^{-4}$ m), FIG. 5B have indicated that the sandwich laminate unit adopting filtration medium as depicted in FIG. 1B as the building block is thinner than the alternating unit formed by stacking of filtration medium as depicted in FIG. 1A, under the same amount of nanofibers.

As will be explained later, filtration media with a single layer of nanofibers coating have much lower air permeability than multi-layer arrangement (both alternating and sandwich laminate units) under the same amount of nanofibers. Results shown in FIG. 5B have suggested that the sandwich arrangement is superior to the alternating arrangement in terms of saving substrate medium, thus reducing overall thickness and limiting production cost.

Example 2

Solid Volume Fraction Comparison of Filtration Media

Figure 6:
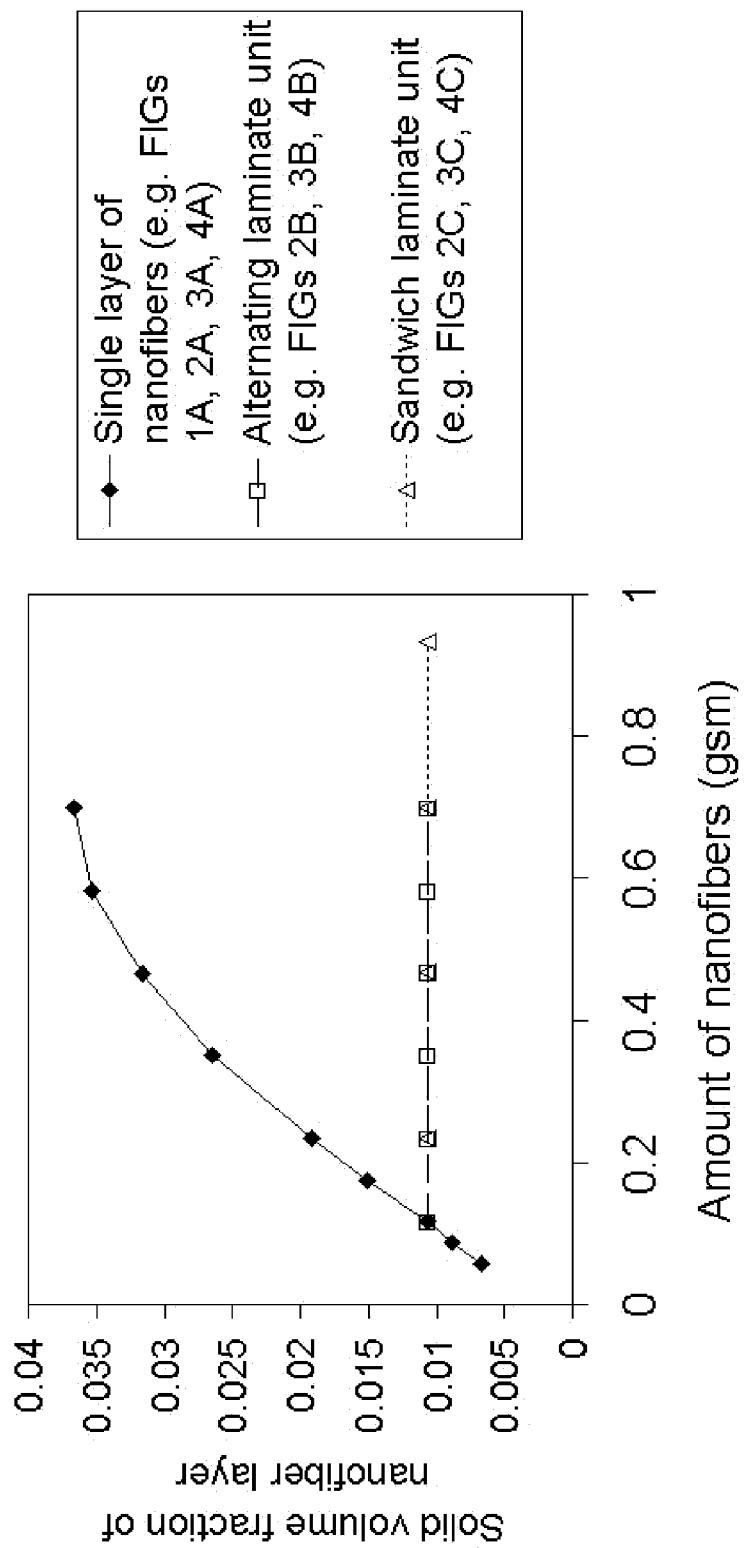
FIG. 6 depicts the solid volume fraction of nanofibers of the filtration medium as measured against the prior art.

The solid volume fractions of filtration media consist of single layer and multiple layers of nanofibers were compared, as depicted in FIG. 6. The results have indicated that when nanofibers were concentrated in a single layer, the solid volume fraction increased with the amount of nanofibers. To fabricate a filtration medium with nanofibers distributed sparsely along its thickness, the filtration medium was stacked against relatively low solid volume fraction until the target amount of nanofibers was met. For example, in the case of single layer of nanofibers, the solid volume fraction was at about 0.01065 at 0.1167 gsm of nanofibers, but increased substantially to about 0.0366 at 0.7 gsm. In contrast, a filtration medium formed by stacking 6 layers of filtration medium containing 0.7 gsm of nanofibers has a solid volume fraction maintained at 0.01065.

The results in FIG. 6 shows that nanofibers that were distributed sparsely along filtration medium thickness by multi-layer arrangement lead to desirable properties, such as increased porosity (or lower solid volume fraction) and reduced pressure drop.

Example 3

Porosity Comparison of Filtration Media

The porosities of filtration media consist of single layer and multiple layers of nanofibers were compared, as depicted in FIG. 7. Porosity and solid volume fraction are related by:

Porosity=1−Solid Volume Fraction.

Similar to the results as show in FIG. 6, nanofibers that were distributed sparsely along filtration medium thickness by multi-layer arrangement lead to desirable properties, such as increased porosity (or lower solid volume fraction) and reduced pressure drop.

Example 4

Capture Efficiency Versus Pressure Drop Comparison of Filtration Media

Figure 8A:
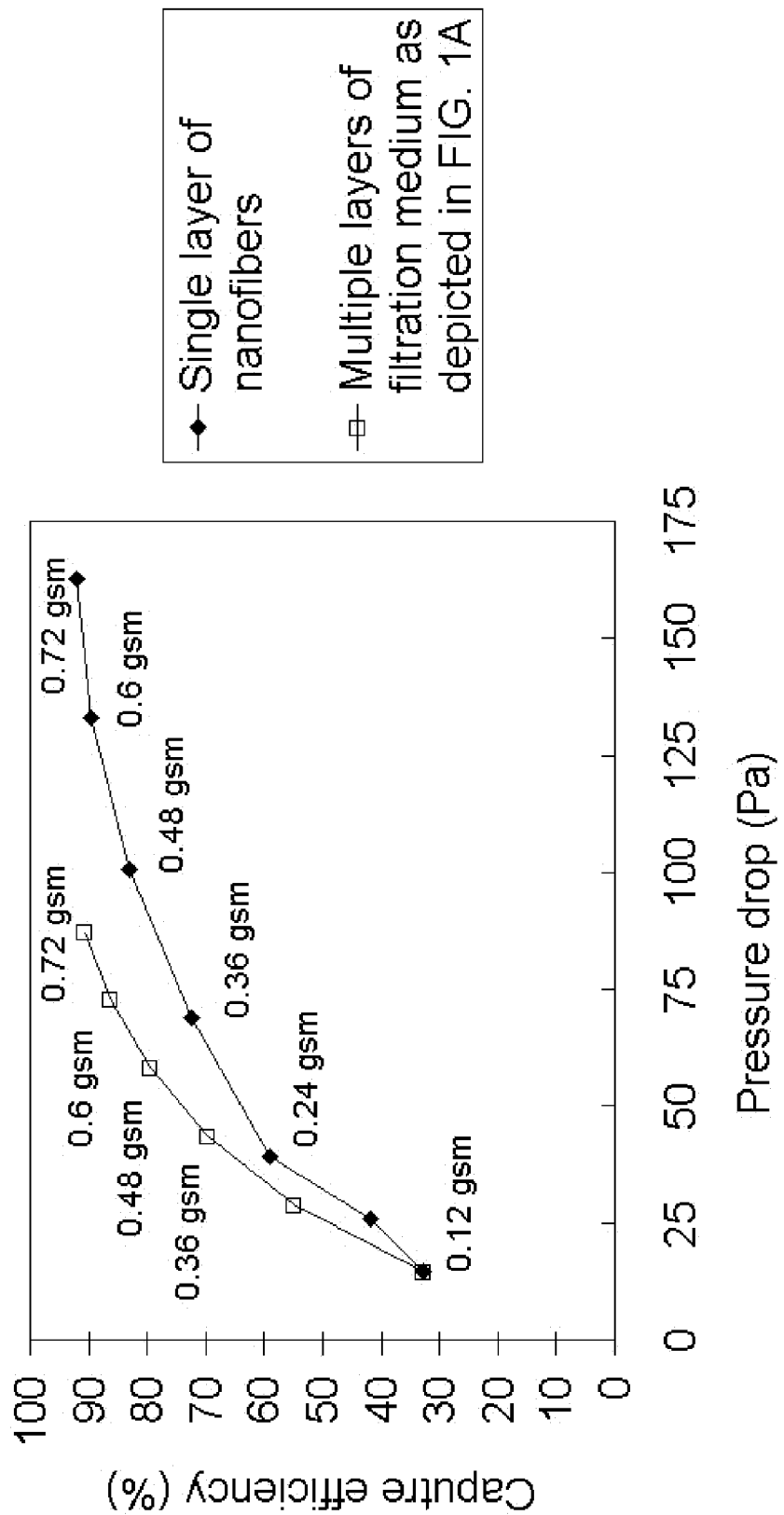
FIG. 8A depicts the capture efficiency and pressure drop for single layer and mutli-layer filtration media.

The capture efficiency versus pressure drop of filtration media consist of single layer and multiple layers of nanofibers were compared, as depicted in FIG. 8A. Each nanofiber layer in the multi-layer arrangement had 0.12 gsm of nanofibers coated on a substrate medium.

The results have indicated that under a given amount of nanofibers (as labeled parameter on the curves), the capture efficiency was comparable between the single layer and multi-layer arrangement. However, the pressure drop has showed a marked difference. For example, while the substrate medium coated with 0.72 gsm of nanofibers (represented by hollows in FIG. 8A) yielded a pressure drop of 162.6 Pa, the filtration medium formed by stacking of 6 layers of substrate medium coated with 0.12 gsm of nanofibers (represented by solids in FIG. 8A) only yielded a pressure drop of 87.49 Pa. The results have shown multi-layer arrangement in the nanofiber filtration medium can improve air permeability (i.e.

lower pressure drop), with small reduction in capture efficiency as a tolerable trade-off.

Example 5

Capture Efficiency Versus Pressure Drop Comparison for Facemasks

Figure 8B:
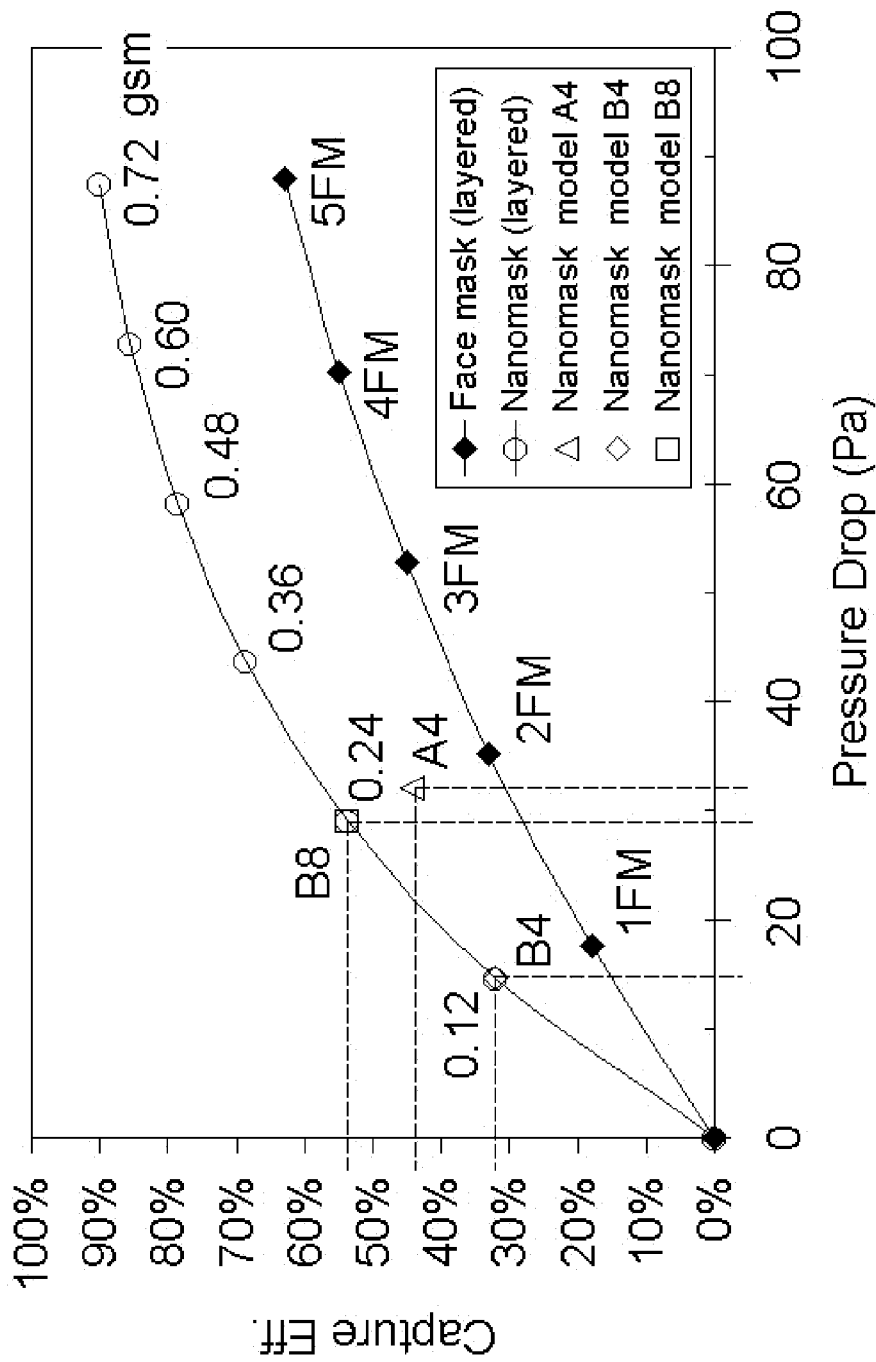
FIG. 8B depicts the capture efficiency and pressure drop for single layer and mutli-layer facemask filtration media.

To demonstrate the potential as a substitute to existing filtration products, the nanofiber filtration medium in multilayer arrangement was compared against disposable conventional surgical facemasks, as depicted in FIG. 8B. The dotted line in FIG. 8B represents stacking of substrate medium coated with 0.12 gsm of nanofibers, while the solid line represents stacking of conventional face masks.

Model A4 was a filtration medium having 0.12 gsm of nanofibers coated on a conventional facemask. Model A4 had a capture efficiency of 44% and a pressure drop of 32.16 Pa. This capture efficiency was equivalent to having three face masks aligned in series. However, the pressure drop across three facemasks aligned in series was 46 Pa, i.e. 30% higher than that of the model A4 filtration medium.

Model B8 was a filtration medium formed by stacking two layers of substrate medium coated with 0.12 gsm of nanofibers. Model B8 had a capture efficiency of 54% and a pressure drop of 29.16 Pa. This capture efficiency was equivalent to having four face masks aligned in series. However, the pressure drop of having four face masks aligned in series was 70 Pa, i.e. 240% higher than that of the model B8 filtration medium.

The results have shown that the filtration medium has outperformed conventional facemasks by having higher capture efficiency and/or lower pressure drop.

Example 6

Capture Efficiency Versus Pressures Drop Comparison with N95 Respirators

Figure 8C:
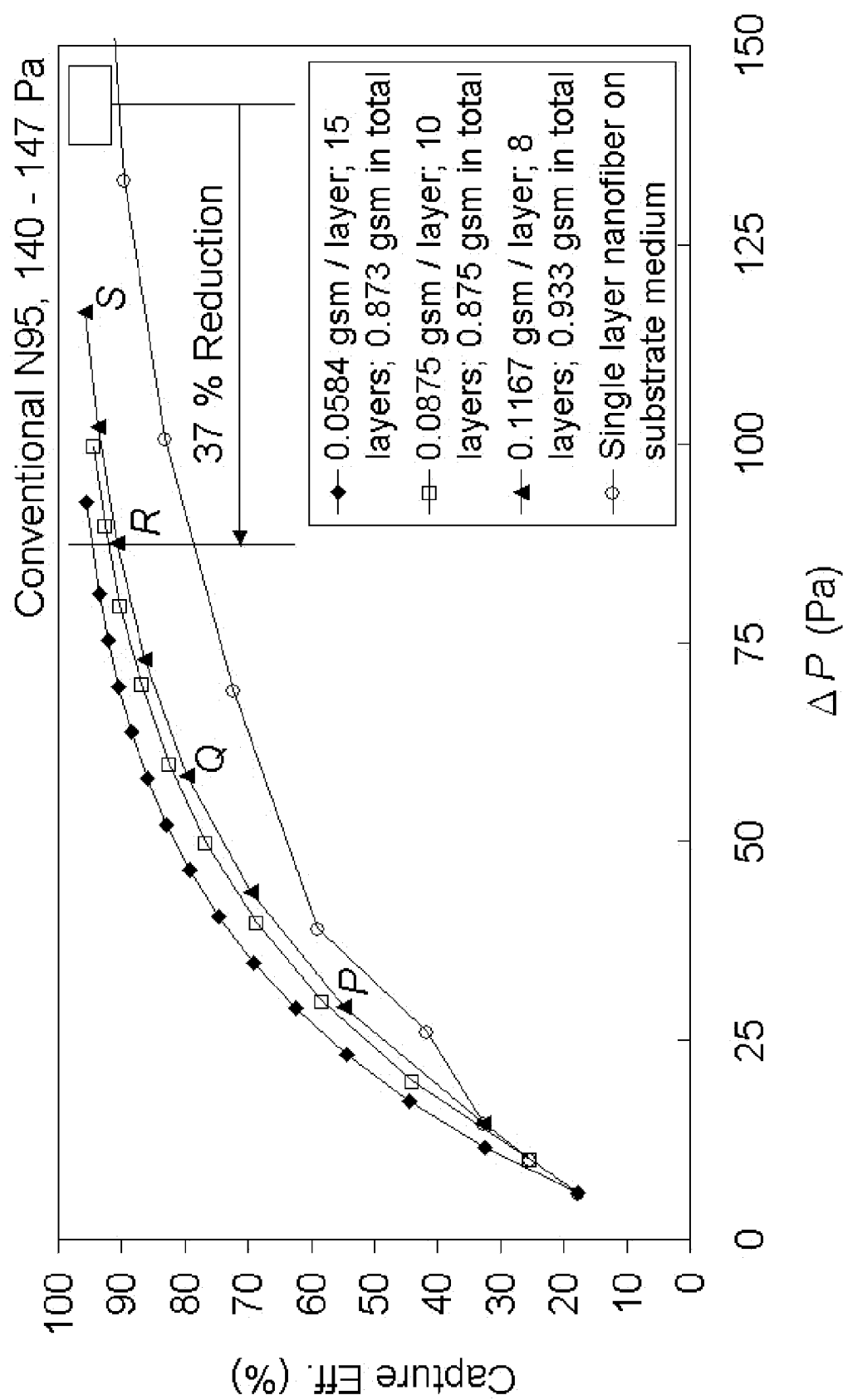
FIG. 8C depicts the capture efficiency and pressure drop for a mutlilayer filtration medium with a minimum of 95% capture of particles of 0.3 micron in size.
Figure 9:
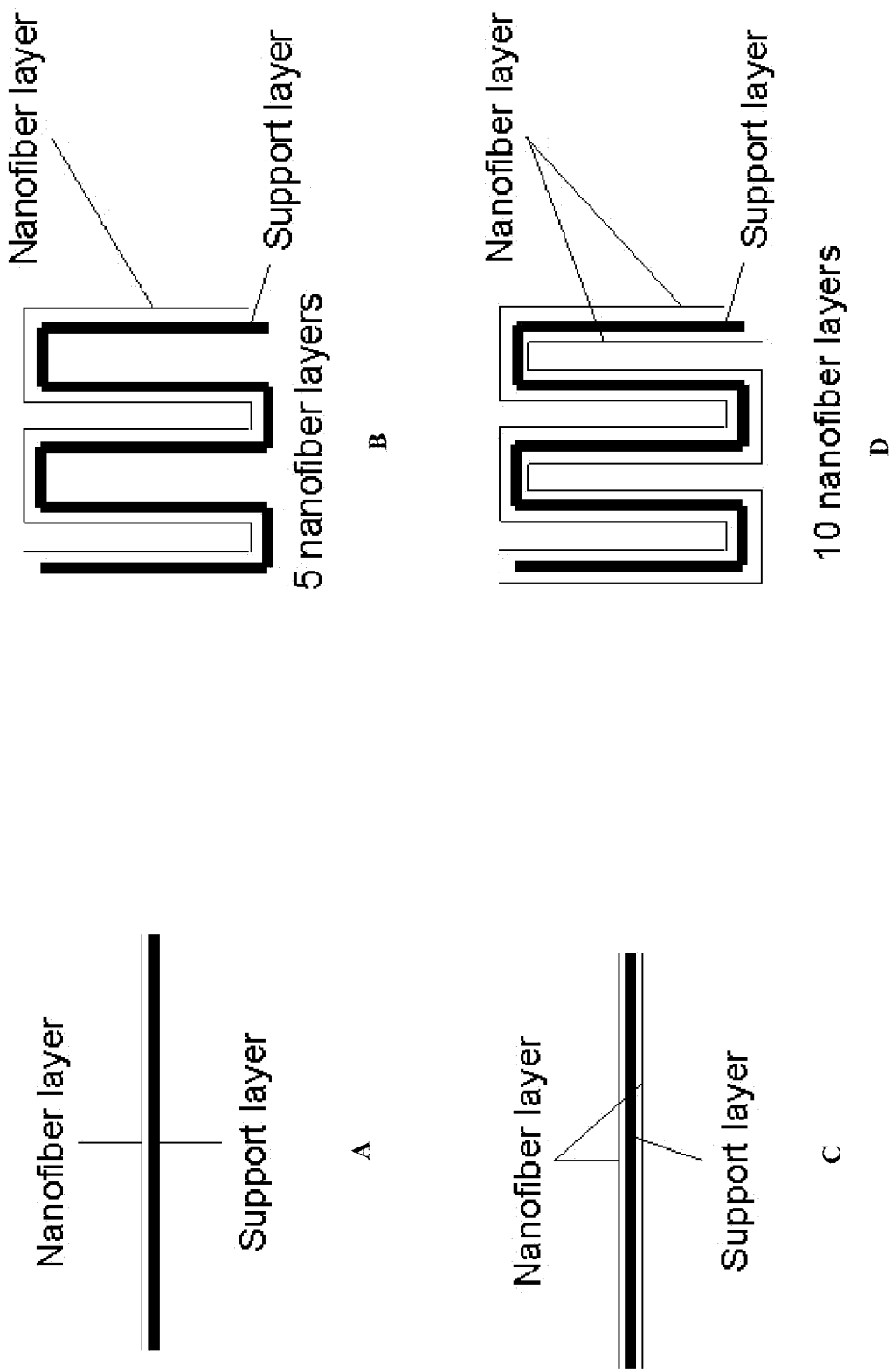
FIG. 9A depicts a single nanofiber layer coated on a support porous layer.
FIG. 9B depicts a filtration medium with 5 layers of nanofibers, as folded from the single nanofiber layer of FIG. 9A.
FIG. 9C depicts a single nanofiber layer coated on both sides of a support porous layer.
FIG. 9D depicts a filtration medium with 10 layers of nanofibers, as folded from the single nanofiber layer of FIG. 9C.

The capture efficiency and pressure drop of various filtration media formed by stacking of substrate medium coated with nanofibers in various nanofiber packing densities (0.0584, 0.0875 and 0.1167 gsm) were compared against conventional N95 respirators, as depicted in FIG. 8C. The results indicated that the pressure drop of conventional N95 respirators were about 140 to 147 Pa. Comparatively, the pressure drop of the filtration medium formed by stacking 15 layers of substrate medium coated with 0.0584 gsm of nanofibers was only 90 Pa (37% reduction in pressure drop). However, the filtration medium had a capture efficiency of 95% against 0.3-micron particles, which matched the capture efficiency of the N95 respirators. Nanofibers can also be coated on both sides of the substrate medium. By coating preferably 0.1167 gsm of nanofibers on each of the two sides of the substrate medium, the filtration medium depicted in FIG. 1B can be obtained. It has a capture efficiency of 54.89% against 0.3-micron particles, and a pressure drop of 29.16 Pa, which are identical to the filtration medium formed by stacking 2 layers of substrate medium coated with 0.1167 gsm of nanofibers on one side only (point P in FIG. 8C). The arrangement of FIG. 1B is advantageous since it saves one substrate medium. FIG. 2C shows the filtration medium formed by stacking 2 filtration medium of FIG. 1B. Its capture efficiency and pressure drop are the same as the filtration medium formed by stacking 4 layers of substrate medium coated with 0.1167 gsm of nanofibers on one side only (point Q in FIG. 8C), and it saves two substrate medium. Similarly, the arrangement depicted in FIG. 3C can save three substrate medium (point R in FIG. 8C), and the arrangement shown in FIG. 4C can save four substrate medium (point S in FIG. 8C).

Example 7

Degree of Pressure Drop Reduction Depends on Target Capture Efficiency

The capture efficiency and pressure drop of filtration media formed by stacking substrate medium coated with various quantities of nanofibers were compared against each other, as depicted in FIGS. 10 to 14. Capture efficiencies against 50, 100, 200, 300 and 400 nm particles were depicted in FIGS. 10, 11, 12, 13 and 14, respectively.

Figure 10:
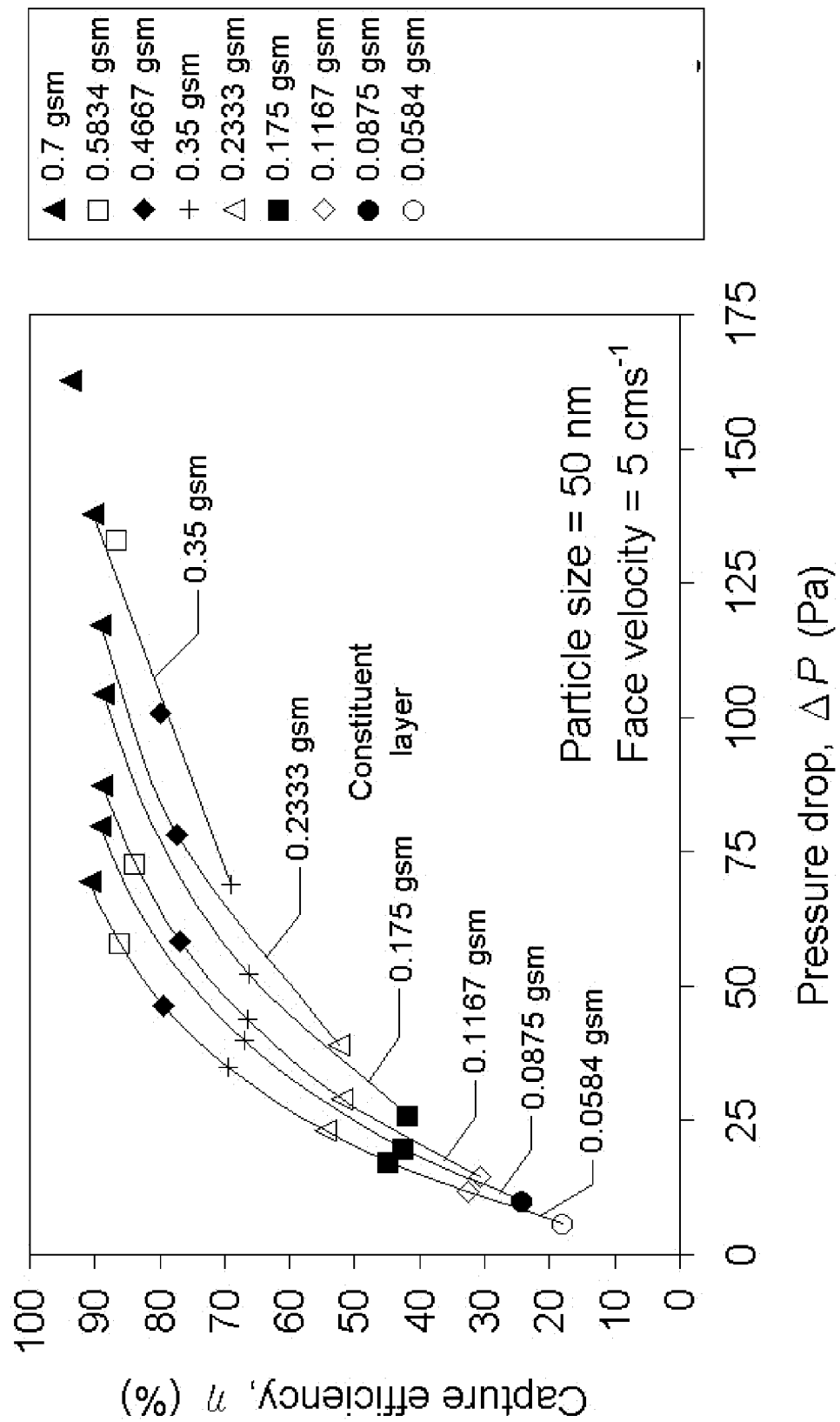
FIG. 10 depicts the capture efficiency and pressure drop for mutli-layer filtration media at various packing density subjected to particles at 50 nm.
Figure 11:
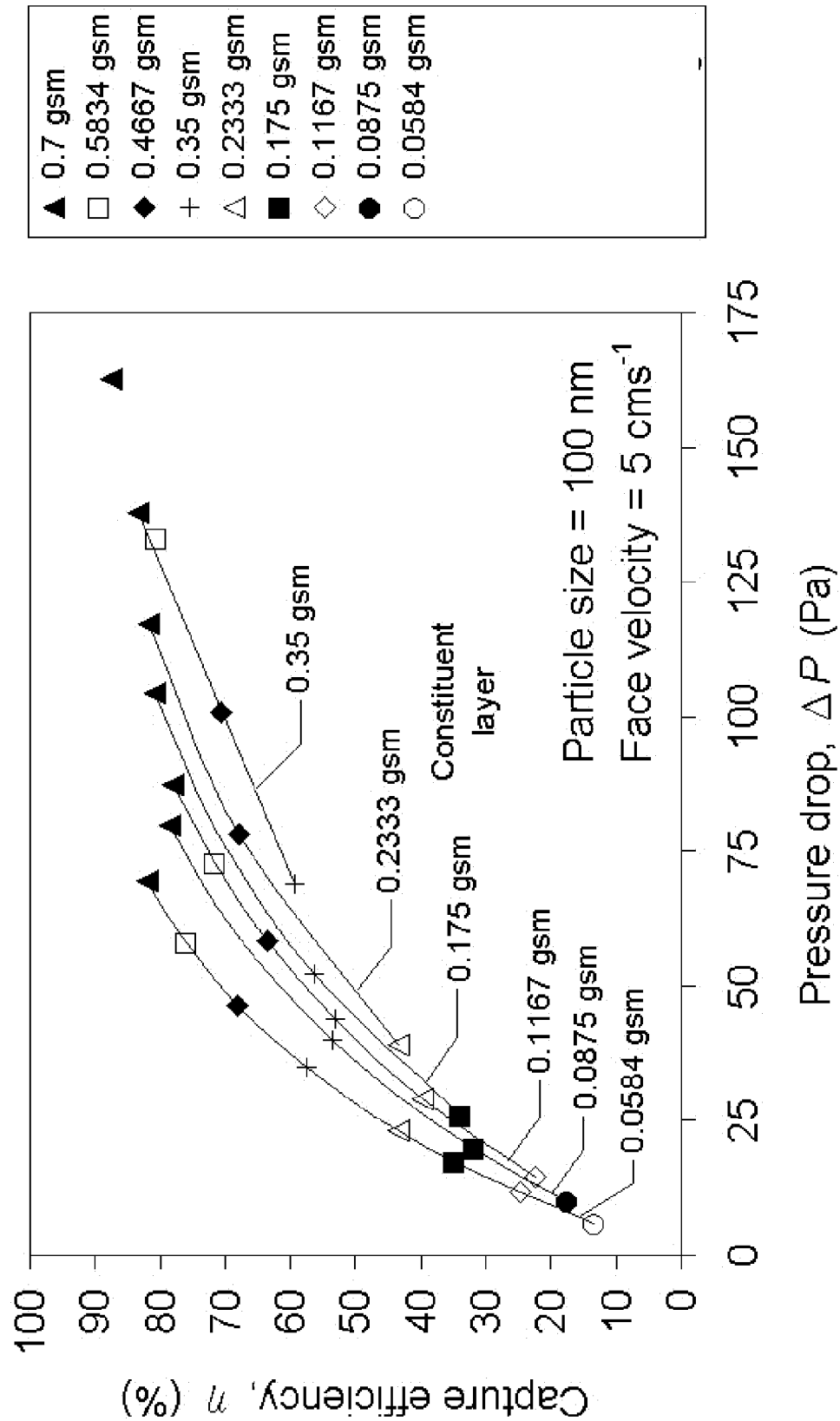
FIG. 11 depicts the capture efficiency and pressure drop for mutli-layer filtration media at various packing density subjected to particles at 100 nm.
Figure 12:
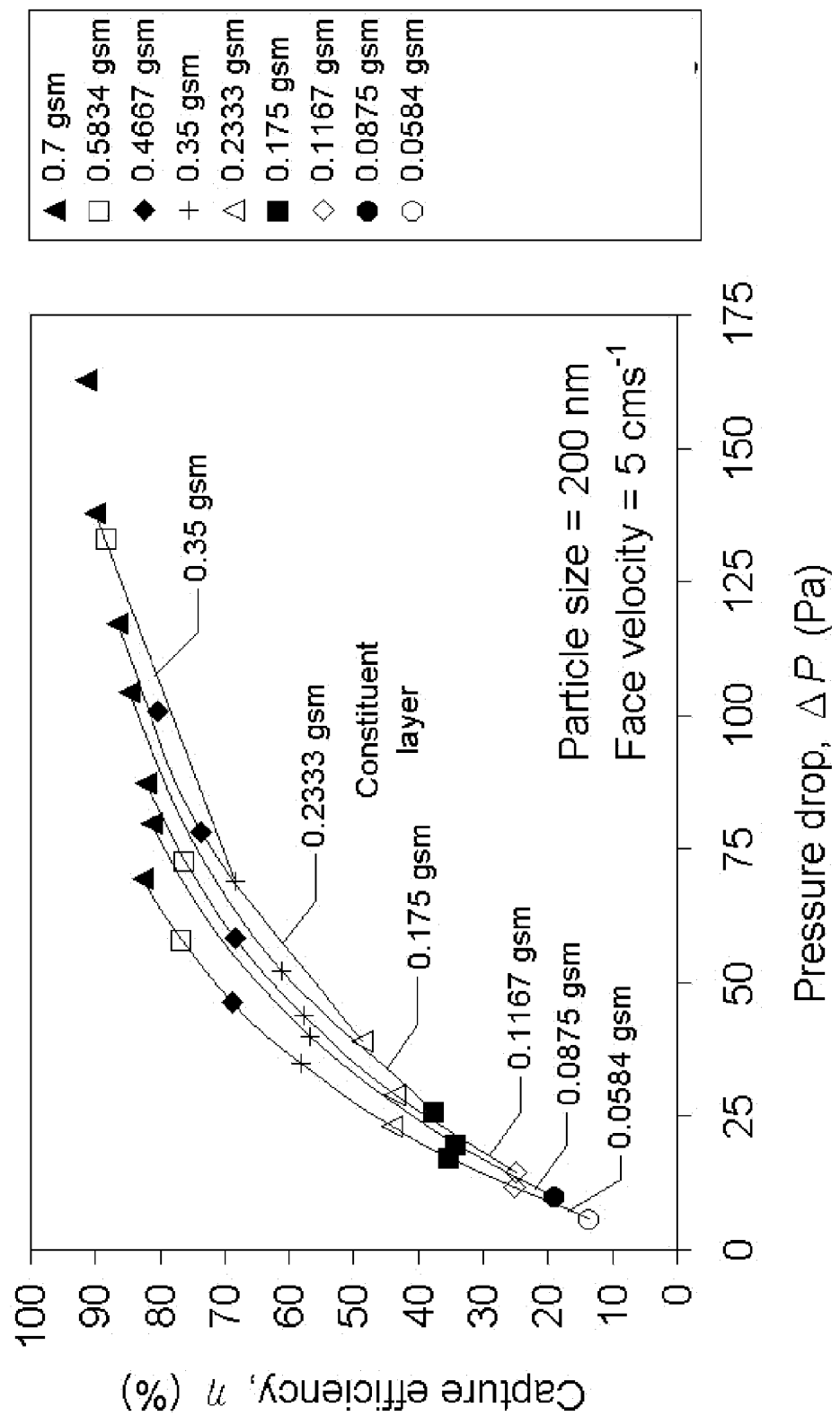
FIG. 12 depicts the capture efficiency and pressure drop for mutli-layer filtration media at various packing density subjected to particles at 200 nm.
Figure 13:
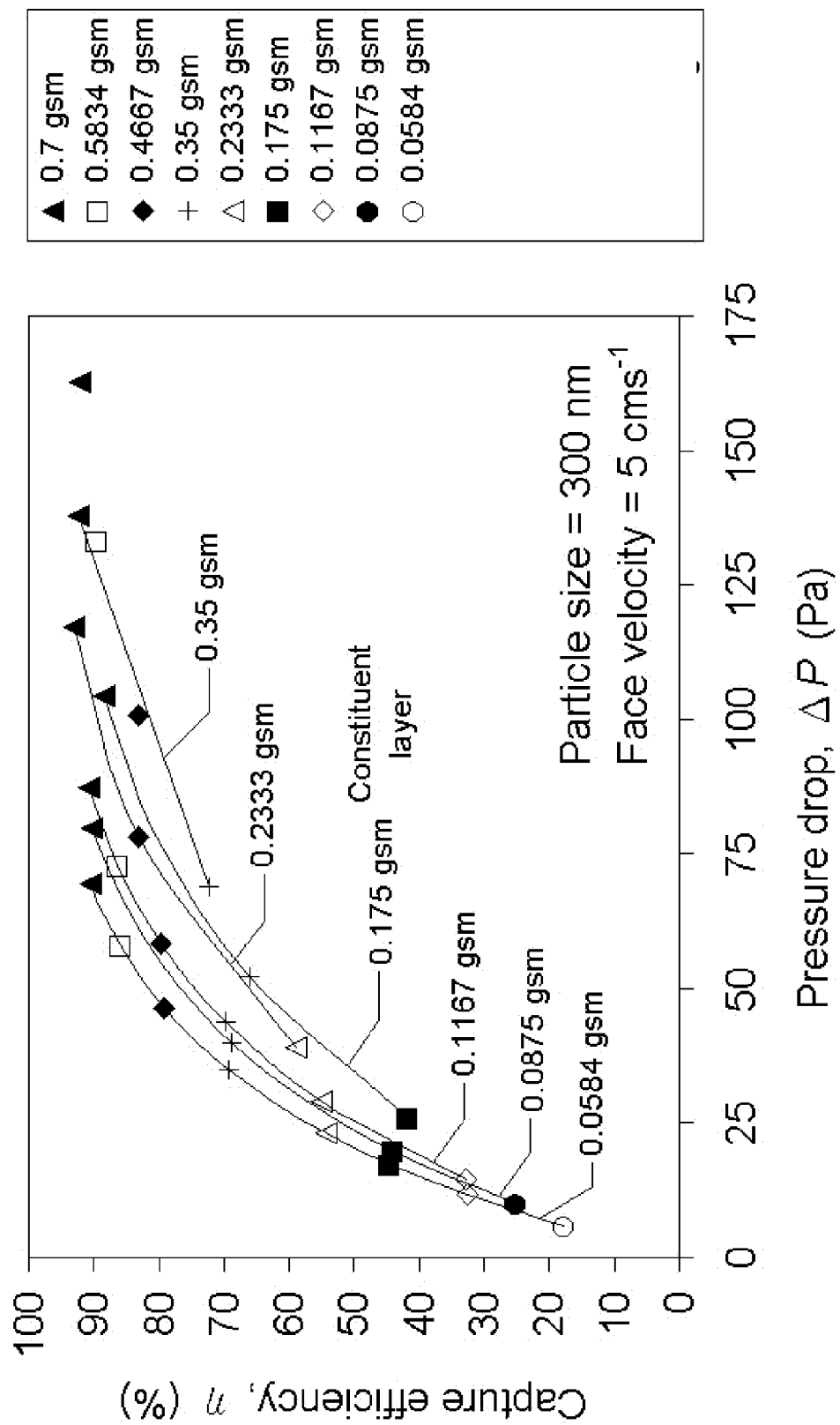
FIG. 13 depicts the capture efficiency and pressure drop for mutli-layer filtration media at various packing density subjected to particles at 300 nm.
Figure 14:
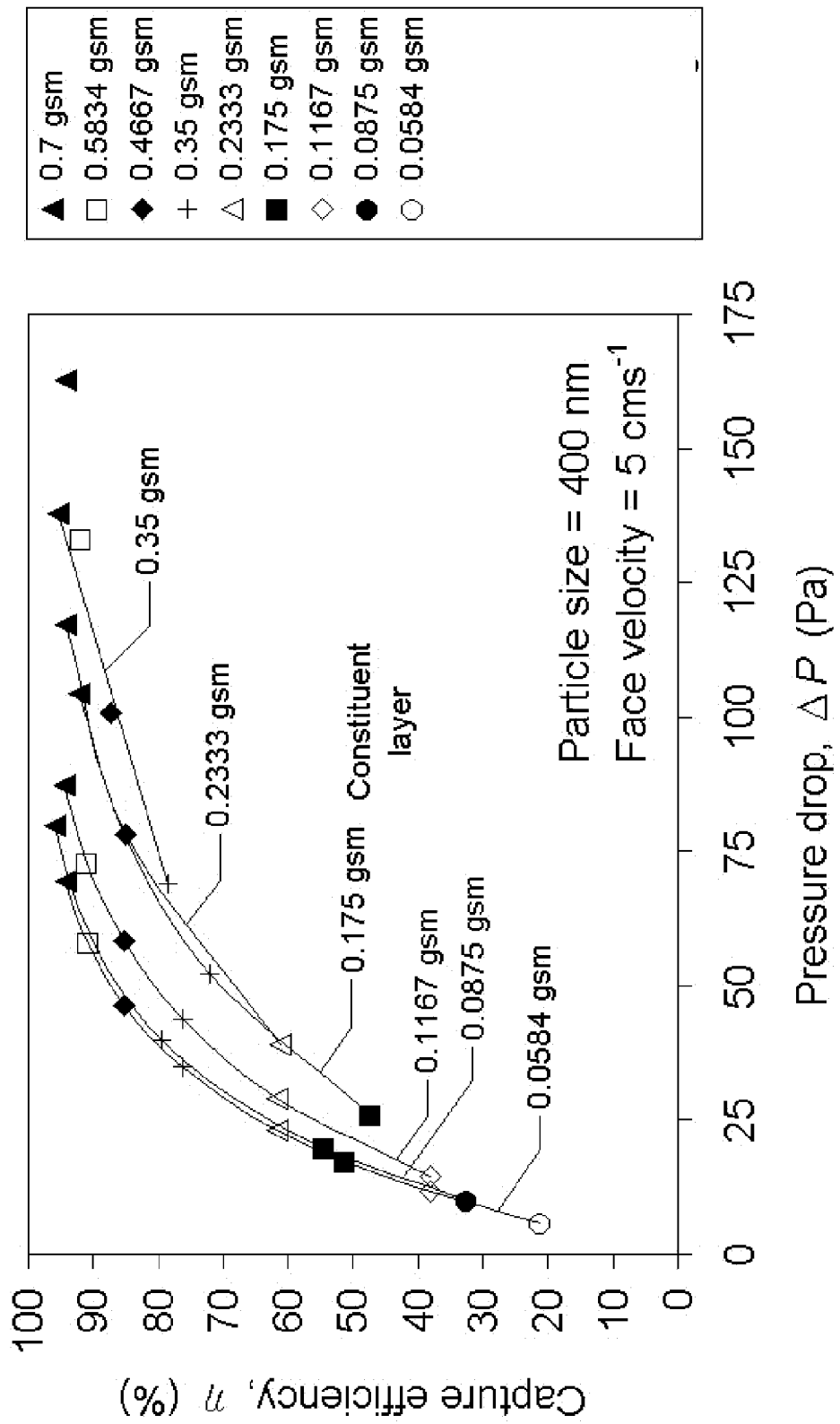
FIG. 14 depicts the capture efficiency and pressure drop for mutli-layer filtration media at various packing density subjected to particles at 400 nm.

FIG. 10 depicts the results of filtration media formed by substrate medium coated with a layer of nanofibers (data points marked with "1" next to them) versus filtration media formed by stacking of substrate medium coated with nanofibers in different quantities (data points marked with numbers other than "1", indicating there is more than one nanofiber layer). For example, a substrate medium coated with 0.7 gsm of nanofibers attained 92% capture efficiency against 50 nm particles and a pressure drop of 164 Pa. In contrast, a filtration medium formed by stacking 6 layers of substrate medium, each coated with 0.1167 gsm of nanofibers attained nearly 90% of efficiency and a pressure drop of only 88 Pa (i.e., a 46% reduction). Furthermore, a filtration medium formed by stacking 12 layers of substrate medium, each coated with 0.0584 gsm of nanofibers also attained 90% efficiency and a lower pressure drop at 70 Pa (57% reduction). This phenomenon can be observed for other particle sizes, as depicted in FIGS. 11 to 14.

In summary, the results in FIGS. 10 to 14 have indicated that for the same total amount of nanofibers, the filtration medium with more nanofiber layers had a lower pressure drop. These results be viewed as artificially re-distributing the nanofibers sparsely throughout the filter medium thickness, thus increased the porosity of nanofiber layer and resulted in a more permeable medium. The decrease in pressure drop was found to be more significant in filter media with more nanofibers, e.g. 0.7 gsm of nanofibers. For filter media that contained lesser amount of nanofibers, e.g. 0.0875 gsm, the advantages obtained from pressure drop reduction may not be able to cover the increased cost due to extra consumption and processing of substrate medium.

Example 8

Figure 15:
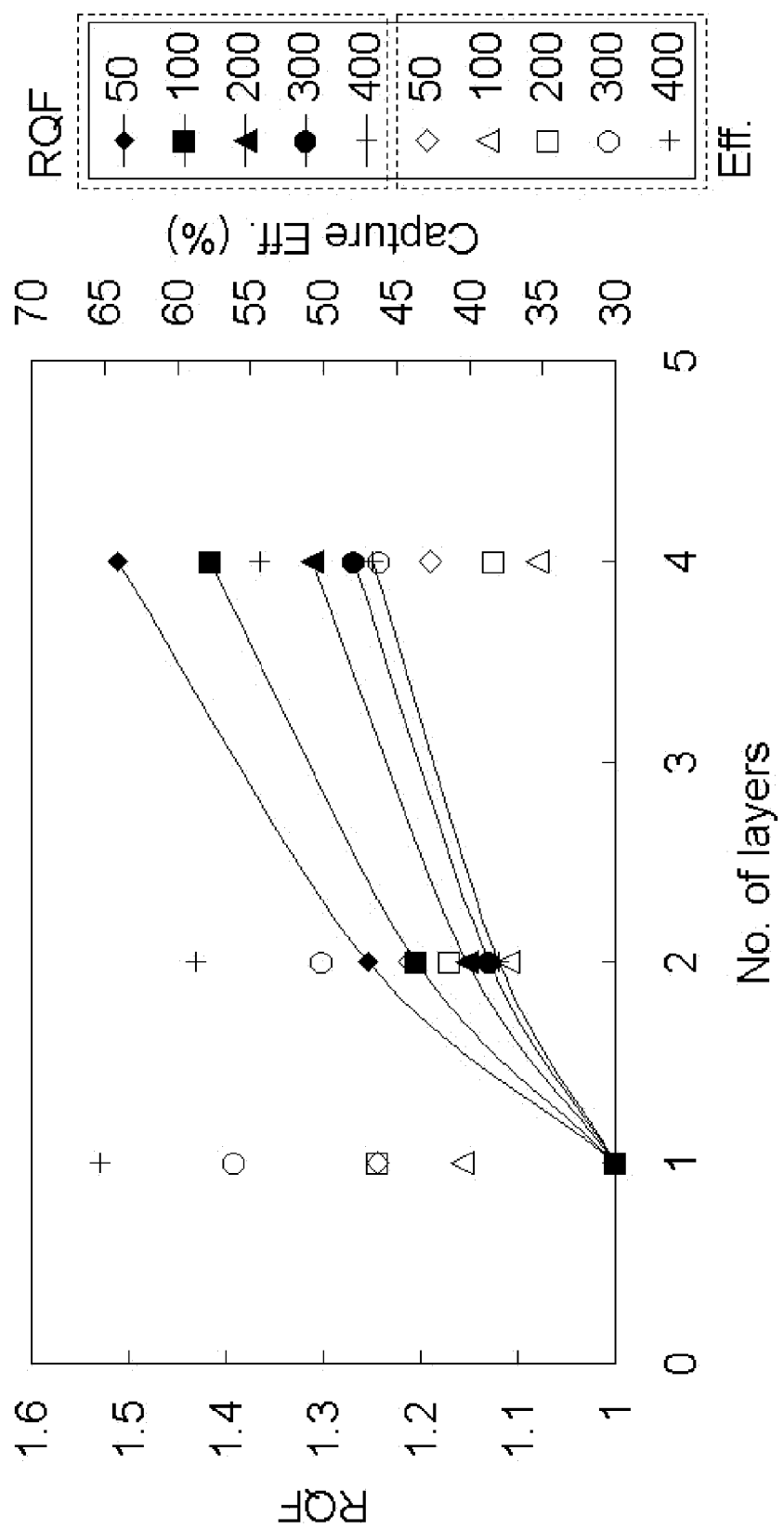
FIG. 15 depicts the relative quality factor and capture efficiency for multi-layer nanofiber filtration medium at 0.233 grams per square meter of nanofibers.
Figure 16:
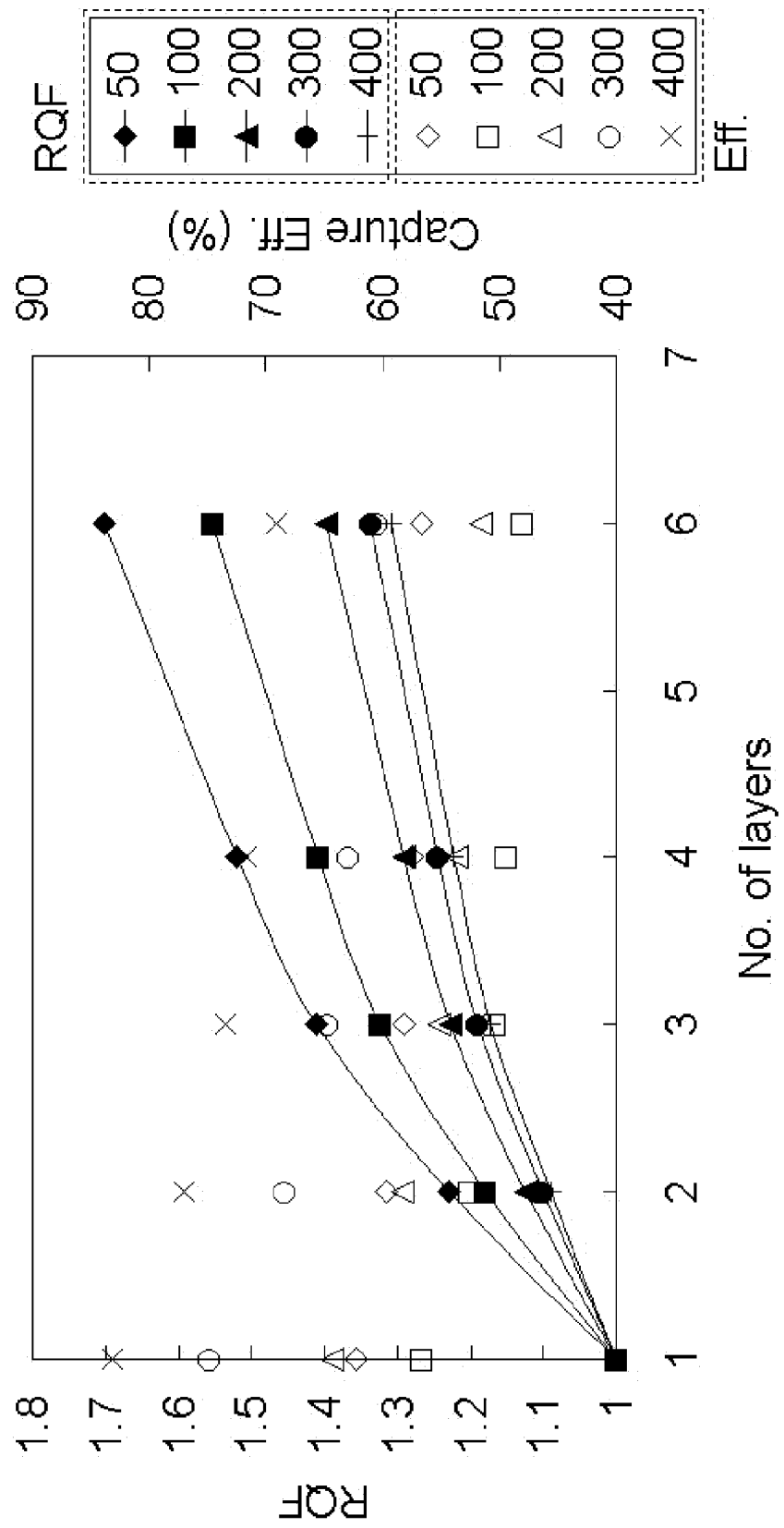
FIG. 16 depicts the relative quality factor and capture efficiency for multi-layer nanofiber filtration medium at 0.350 grams per square meter of nanofibers.
Figure 17:
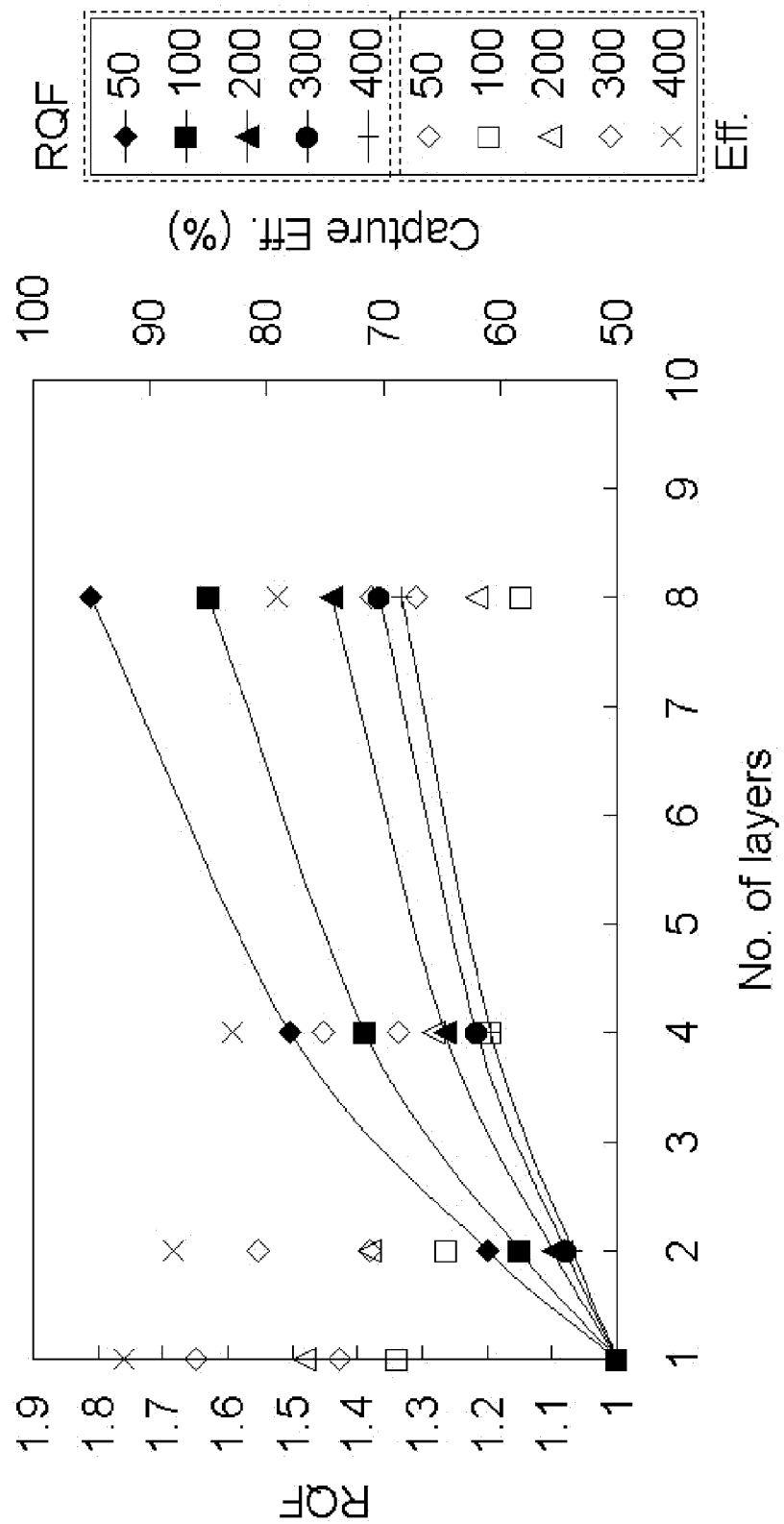
FIG. 17 depicts the relative quality factor and capture efficiency for multi-layer nanofiber filtration medium at 0.467 grams per square meter of nanofibers.

Relative Quality Factor and Capture Efficiency of Multi-Layer Nanofiber Filtration Media RQF and capture efficiency of multilayer filtration media having various nanofiber packing densities were measured, as depicted in FIGS. 15 to 17. The multilayer filtration medium having a packing density of 0.233 $g/m^2$ was depicted in FIG. 15. The multilayer filtration medium having a packing density of 0.35 $g/m^2$ was depicted in FIG. 16. The multilayer filtration medium having a packing density of 0.467 $g/m^2$ was depicted in FIG. 17.

The results in FIGS. 15 to 17 have indicated that for the same total amount of nanofibers in terms of grams per square meter, increasing the number of nanofiber layers in the multilayer filtration medium significantly reduced the pressure drop.

While the examples of the filtration medium have been described, it should be understood that the filtration medium are not so limited and modifications may be made. The scope of the filtration medium is defined by the appended claims, and all devices that come within the meaning of the claims, either literally or by equivalence, are intended to be embraced therein.

We claim:

1. A method of making a multilayer filter, comprising the steps of:
   (a) coating a layer of nanofibers on a single side or on both sides of a substrate layer to obtain a composite filter medium; and
   (b) folding the composite filter medium into a serpentine-shaped arrangement to form a multilayer filter wherein the composite filter medium is folded into a plurality of nanofiber layers arranged in a sequential arrangement having alternating essentially perpendicular segments and essentially parallel segments with respect to airflow;
   wherein the essentially perpendicular segments are larger than the essentially parallel segments;
   wherein when airflow is applied, air passes through the plurality of nanofiber layers; and
   wherein in the multilayer filter pressure drop is reduced by at least 20% when compared with a filter having nanofibers deposited in a single layer while attaining a filtration efficiency within 10% of the filter having the nanofibers deposited in a single layer.

2. The method of claim 1, wherein a layer of nanofibers is coated on both sides of the substrate layer.

3. The method of claim 1, wherein the substrate layer is made of coarse fibers having an average diameter in the range of between 1 and 30 microns, a basis weight in the range of between 10 and 600 gsm, a thickness of less than 100 microns, a pressure drop of less than 2 Pa under 5 $cms^{-1}$ face velocity, and a filtration efficiency of less than 3% for a particle size ranging from 0.05 to 0.5 microns.

4. The method of claim 1, wherein the layer of nanofibers has an average diameter within the range of between 0.1 and 0.4 microns, a basis weight of less than 0.3 gsm, and a thickness of less than 10 microns.

5. The method of claim 1, wherein the composite filter medium has a filtration efficiency ranging from 18 to 54% against a 0.3 micron particle and a pressure drop ranging from 4.9 to 28 Pa under 5 $cms^{-1}$ face velocity.

6. A method of making a multilayer filter, comprising the steps of:
   (a) coating a layer of nanofibers on both sides of a substrate layer to obtain a composite filter medium; and
   (b) stacking up a plurality of sheets of the composite filter medium to form a multilayer filter comprising a structure of one or more layers of nanofibers being sandwiched between two layers of the substrate layer;
   wherein the substrate layer is made of coarse fibers having an average diameter in the range of between 1 and 30 microns, a basis weight in the range of between 10 and 600 gsm, a pressure drop of less than 2 Pa under 5 $cms^{-1}$ face velocity, and a filtration efficiency of less than 3% for a particle size ranging from 0.05 to 0.5 microns;
   wherein the layer of nanofibers has an average diameter within the range of between 0.1 and 0.4 microns, a basis weight of less than 0.3 gsm, and a thickness of less than 10 microns; and
   wherein in the multilayer filter pressure drop is reduced by at least 20% when compared with a filter having nanofibers deposited in a single layer while attaining a filtration efficiency within 10% of the filter having the nanofibers deposited in a single layer.

7. The method of claim 6, wherein the composite filter medium has a filtration efficiency ranging from 18 to 54% against 0.3 micron particle and a pressure drop ranging from 4.9 to 28 Pa under 5 $cms^{-1}$ face velocity.

8. The multilayer filter of claim 6, wherein the multilayer filter have a relative quality factor that is at least 10% higher compared to that of a filter having nanofibers deposited in a single layer for a particle size ranging from 50 to 400 nm under 5 cms-1 and with a total fiber content of between about 0.233 to about 0.467 gram per square meter of filter area.

9. The multilayer filter of claim 6, wherein, when airflow is applied, air passes through the structure of one or more layers of nanofibers.

10. A multilayer filter having a top layer and a bottom layer and comprising:
    (i) a plurality of layers of a substrate layer; and
    (ii) a plurality of layers of nanofibers,
    the top layer and bottom layer each being a layer of the nanofibers and between the top layer and bottom layer there being at least one unit, or a plurality of units, each comprising one or more layers of the nanofibers sandwiched between two layers of the substrate layer;
    wherein the substrate layer is made of coarse fibers having an average diameter in the range of between 1 and 30 microns, a basis weight in the range of between 10 and 600 gsm, a pressure drop of less than 2 Pa under 5 $cms^{-1}$ face velocity, and a filtration efficiency of less than 3% for a particle size ranging from 0.05 to 0.5 microns;
    wherein the layer of nanofibers has an average diameter within the range of between 0.1 and 0.4 microns, a basis weight of less than 0.3 gsm, and a thickness of less than 10 microns; and
    wherein the nanofibers maintain a pressure drop that is reduced by at least 20% when compared with a filter having nanofibers deposited in a single layer while attaining a filtration efficiency within 10% of the filter having the nanofibers deposited in a single layer.

11. The multilayer filter of claim 10, wherein the nanofibers comprise a polymer selected from the group consisting of a polyolefin, a polyacetal, a polyamide, a polyester, a cellulose ether, a cellulose ester, a polyalkylene sulfide, a polyarylene oxide, a polysulfone, a modified polysulfone polymer, a nylon, a polystyrene, a polyacrylonitrile, a polycarbonate, and mixtures thereof.

12. The multilayer filter of claim 10, further comprising:
    (iii) a cover layer having a hydrophobic layer bonded to the cover layer and wherein the hydrophobic layer is gas permeable.

13. The multilayer filter of claim 10, wherein the substrate layer comprises a microfiber selected from the group consisting of polyethylene, glass, cellulose acetate, activated carbon fiber, and combinations thereof.

14. The multilayer filter of claim 10, wherein the substrate layer comprises an additive.

15. The multilayer filter of claim 14, wherein the additive is in a particulate, fiber, whisker or powder form.

16. The multilayer filter of claim 14, wherein the additive comprises an anti-microbial substrate.

17. The multilayer filter of claim 10, wherein the substrate layer comprises an adsorption particle.

18. The multilayer filter of claim 10, wherein the substrate layer comprises a desorption substance.

19. The multilayer filter of claim 10, wherein the multilayer filter have a relative quality factor that is at least 10% higher compared to that of a filter having nanofibers deposited in a single layer for a particle size ranging from 50 to 400 nm under 5 cms-1 and with a total fiber content of between about 0.233 to about 0.467 gram per square meter of filter area.

20. The multilayer filter of claim 10, wherein, when airflow is applied, air passes through the structure of one or more layers of nanofibers.

21. A method of making a multilayer filter, comprising the steps of:
   (a) coating a layer of nanofibers on both sides of a substrate layer to obtain a composite filter medium; and
   (b) stacking up a plurality of sheets of the composite filter medium to form a multilayer filter comprising a structure of one or more layers of nanofibers being sandwiched between two layers of the substrate layer;
   wherein the substrate layer is made of coarse fibers having an average diameter in the range of between 1 and 30 microns, a basis weight in the range of between 10 and 600 gsm, a pressure drop of less than 2 Pa under 5 cms$^{-1}$ face velocity, and a filtration efficiency of less than 3% for a particle size ranging from 0.05 to 0.5 microns; and
   wherein in the multilayer filter pressure drop is reduced by at least 20% when compared with a filter having nanofibers deposited in a single layer while attaining a filtration efficiency within 10% of the filter having the nanofibers deposited in a single layer.

22. The multilayer filter of claim 21, wherein the layer of nanofibers has an average diameter within the range of between 0.1 and 0.4 microns, a basis weight of less than 0.3 gsm, and a thickness of less than 10 microns.

23. The method of claim 21, wherein the composite filter medium has a filtration efficiency ranging from 18 to 54% against 0.3 micron particle and a pressure drop ranging from 4.9 to 28 Pa under 5 cms$^{-1}$ face velocity.

24. A multilayer filter having a top layer and a bottom layer and comprising:
   (i) a plurality of layers of a substrate layer; and
   (ii) a plurality of layers of nanofibers,
   the top layer and bottom layer each being a layer of the nanofibers and between the top layer and bottom layer there being at least one unit, or a plurality of units, each comprising one or more layers of the nanofibers sandwiched between two layers of the substrate layer;
   wherein the substrate layer is made of coarse fibers having an average diameter in the range of between 1 and 30 microns, a basis weight in the range of between 10 and 600 gsm, a pressure drop of less than 2 Pa under 5 cms$^{-1}$ face velocity, and a filtration efficiency of less than 3% for a particle size ranging from 0.05 to 0.5 microns; and
   wherein the nanofibers maintain a pressure drop that is reduced by at least 20% when compared with a filter having nanofibers deposited in a single layer while attaining a filtration efficiency within 10% of the filter having the nanofibers deposited in a single layer.

25. The multilayer filter of claim 24, wherein the layer of nanofibers has an average diameter within the range of between 0.1 and 0.4 microns, a basis weight of less than 0.3 gsm, and a thickness of less than 10 microns.

26. The multilayer filter of claim 24, wherein the nanofibers comprise a polymer selected from the group consisting of a polyolefin, a polyacetal, a polyamide, a polyester, a cellulose ether, a cellulose ester, a polyalkylene sulfide, a polyarylene oxide, a polysulfone, a modified polysulfone polymer, a nylon, a polystyrene, a polyacrylonitrile, a polycarbonate, and mixtures thereof.

27. The multilayer filter of claim 24, further comprising:
   (iii) a cover layer having a hydrophobic layer bonded to the cover layer and wherein the hydrophobic layer is gas permeable.

28. The multilayer filter of claim 24, wherein the substrate layer comprises a microfiber selected from the group consisting of polyethylene, glass, cellulose acetate, activated carbon fiber, and combinations thereof.

29. The multilayer filter of claim 24, wherein the substrate layer comprises an additive.

30. The multilayer filter of claim 29, wherein the additive is in a particulate, fiber, whisker or powder form.

31. The multilayer filter of claim 29, wherein the additive comprises an anti-microbial substrate.

32. The multilayer filter of claim 24, wherein the substrate layer comprises an adsorption particle.

33. The multilayer filter of claim 24, wherein the substrate layer comprises a desorption substance.

* * * * *